United States Patent [19]
Pringle

[11] 3,939,779
[45] Feb. 24, 1976

[54] RAILWAY TRUCK ASSEMBLY

[75] Inventor: William L. Pringle, Grosse Pointe Shores, Mich.

[73] Assignee: United States Steel Corporation, Pittsburgh, Pa.

[22] Filed: Dec. 20, 1974

[21] Appl. No.: 534,674

[52] U.S. Cl. .................................. 105/180; 267/57
[51] Int. Cl.² ........................................ B61D 15/00
[58] Field of Search.... 105/157 R, 180, 179, 218 A; 267/57; 188/59, 73.6

[56] References Cited
UNITED STATES PATENTS

| | | | |
|---|---|---|---|
| 2,594,734 | 4/1952 | Cripe | 105/218 A |
| 2,892,420 | 6/1959 | Cooper | 105/180 X |
| 3,028,173 | 4/1962 | Leffler et al. | 267/57 X |
| 3,334,596 | 8/1967 | Suri | 105/180 |

FOREIGN PATENTS OR APPLICATIONS

| | | | |
|---|---|---|---|
| 619,140 | 3/1949 | United Kingdom | 105/180 |

*Primary Examiner*—John J. Love
*Attorney, Agent, or Firm*—McGlynn and Milton

[57] ABSTRACT

A railway truck assembly including a central hollow beam extending transversely of the assembly and adapted for supporting a railroad car. Four wheel units are attached to the central beam with two of the wheels being aligned adjacent one end of the beam and the other two wheels aligned and extending from the opposite end of the beam. Each wheel unit includes inside and outside arms for supporting an axle at the distal ends for, in turn, rotatably supporting a wheel. The arms extend from a torsion bar support sleeve which, in turn, surrounds a torsion bar. The outward end of each sleeve is splined to the torsion rod and the inward end of the torsion rod is splined to a reaction sleeve which is, in turn, secured to the central beam. The outward end of each torsion bar is supported by a bearing in a cage member secured to the central beam and the inward end of each sleeve member is rotatably supported by a bearing engaging the splined inward end of the torsion rod. Resilient or compressible thrust bearings are disposed at each end of the sleeve member for allowing the sleeve member and, thus, the wheel unit to move longitudinally relative to the torsion rod. Each of the outwardly disposed arms includes a cavity in which is disposed a hydraulic actuator for urging a brake shoe toward the adjacent wheel. Brake shoe retainer pins are disposed on opposite sides of the actuator in bores in the arm for releasably engaging the brake shoes.

21 Claims, 7 Drawing Figures

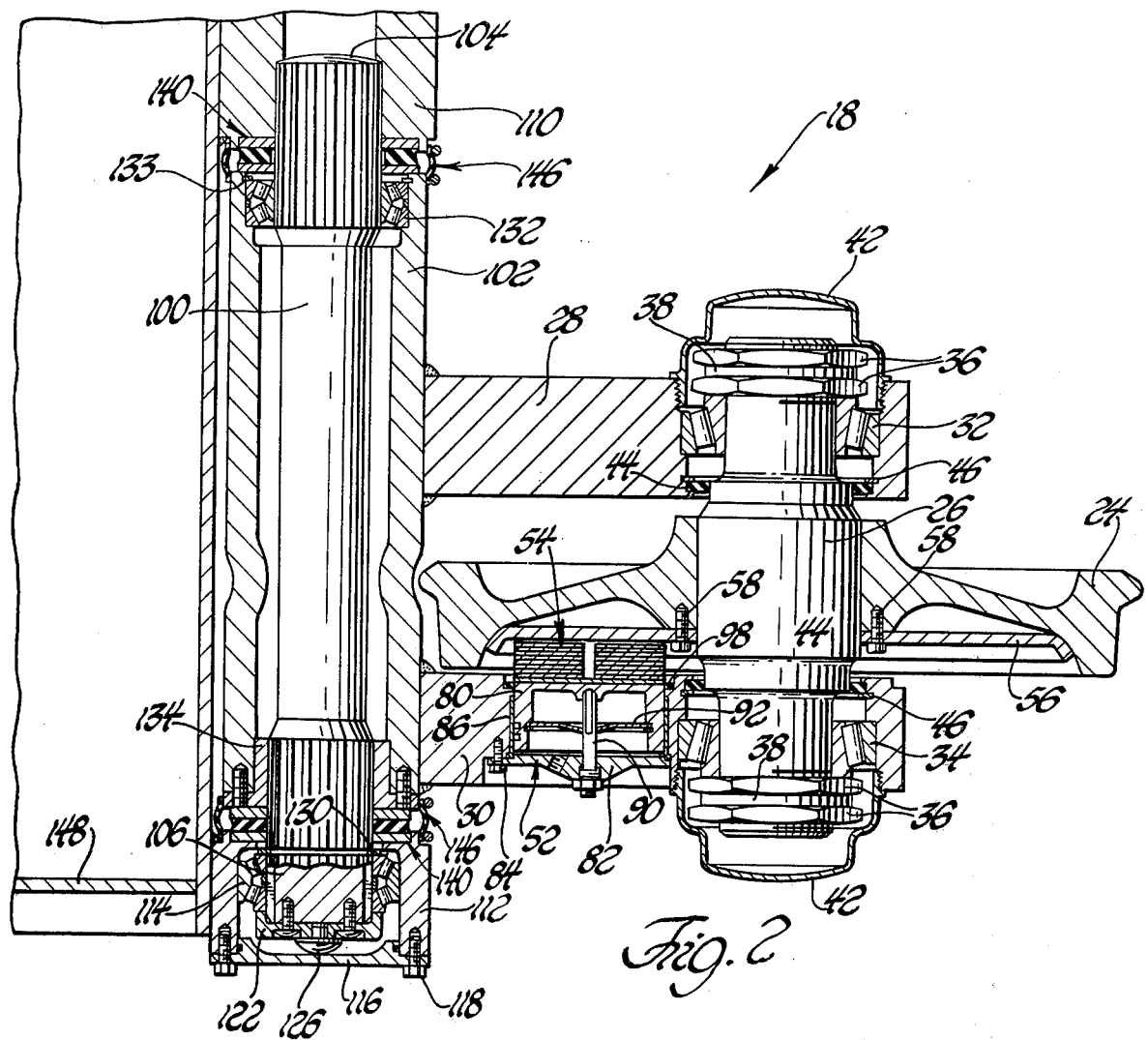
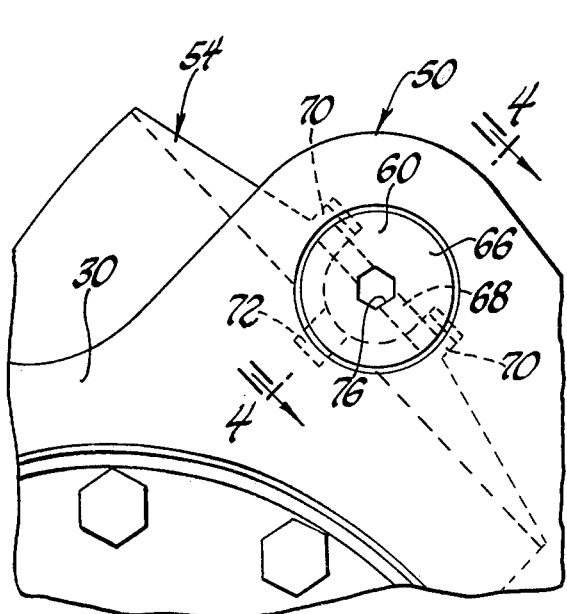
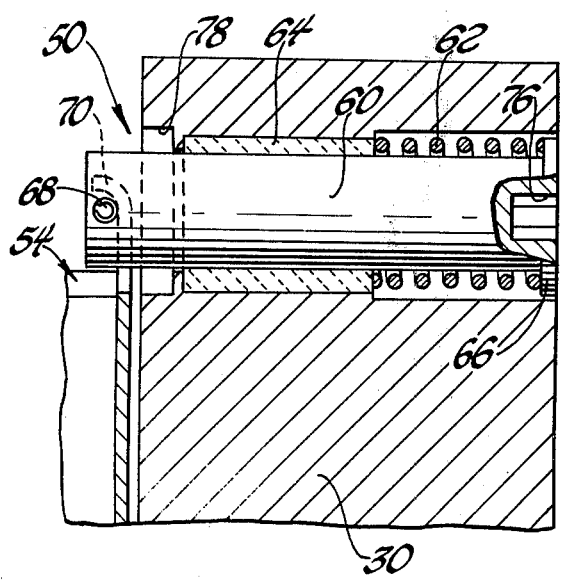

RAILWAY TRUCK ASSEMBLY

This invention relates to a railway truck assembly of the type for supporting railroad cars.

Much of the railroad track in use today is in very poor condition and has, in fact, contributed to derailments. The potential of derailments is greatly increased when the track is in poor condition and the railway truck moving over that track is in poor condition. The most commonly used wheel system is one wherein two railway wheels are united by an integral axle. This means that the two wheels must rotate at the same angular velocity along their respective tracks. Frequently one wheel will wear differently than the other so that one wheel has a larger circumference than the other. If one wheel has a larger circumference or diameter than the other, it tends to move ahead of the smaller wheel and, therefore, creates a very hazardous condition.

Further, when the two wheels are connected by an axle, they are not free to move independently of one another and, therefore, a movement of one wheel to a vertically higher position than the other wheel adversely affects that other wheel in its engagement with its tracks.

Another problem with many of the prior art assemblies is that the brakes often wear out in a very short period of time and is a major task to repair or replace the brakes.

In accordance with the instant invention, there is provided an improved railway truck assembly which overcomes many of the problems associated with the prior art assemblies and is one which will accommodate railroad track which is in very poor condition. The assembly of the present invention includes four wheel units, each of which includes a pair of arms supporting an axle so that each wheel is rotatable independently of the other wheels with the arms for each wheel supported by a carriage means through a torsion means so that each wheel may move in an arc vertically independently of the other wheels. In addition to the unique structure wherein the arms are torsionally supported, the assembly also includes a unique disc brake actuator sub-assembly combined with at least one of the wheel supporting arms.

Other advantages of the present invention will be readily appreciated as the same becomes better understood by reference to the following detailed description when considered in connection with the accompanying drawings wherein:

FIG. 2 is a fragmentary cross-sectional view taken on a horizontal plane through the lower right hand wheel unit shown in FIG. 1;

FIG. 3 is an enlarged fragmentary view showing the upper portion of the outside arm of FIG. 2 to illustrate the brake shoe support means;

FIG. 4 is a fragmentary cross-sectional view taken substantially along line 4—4 of FIG. 3;

Figure 1:
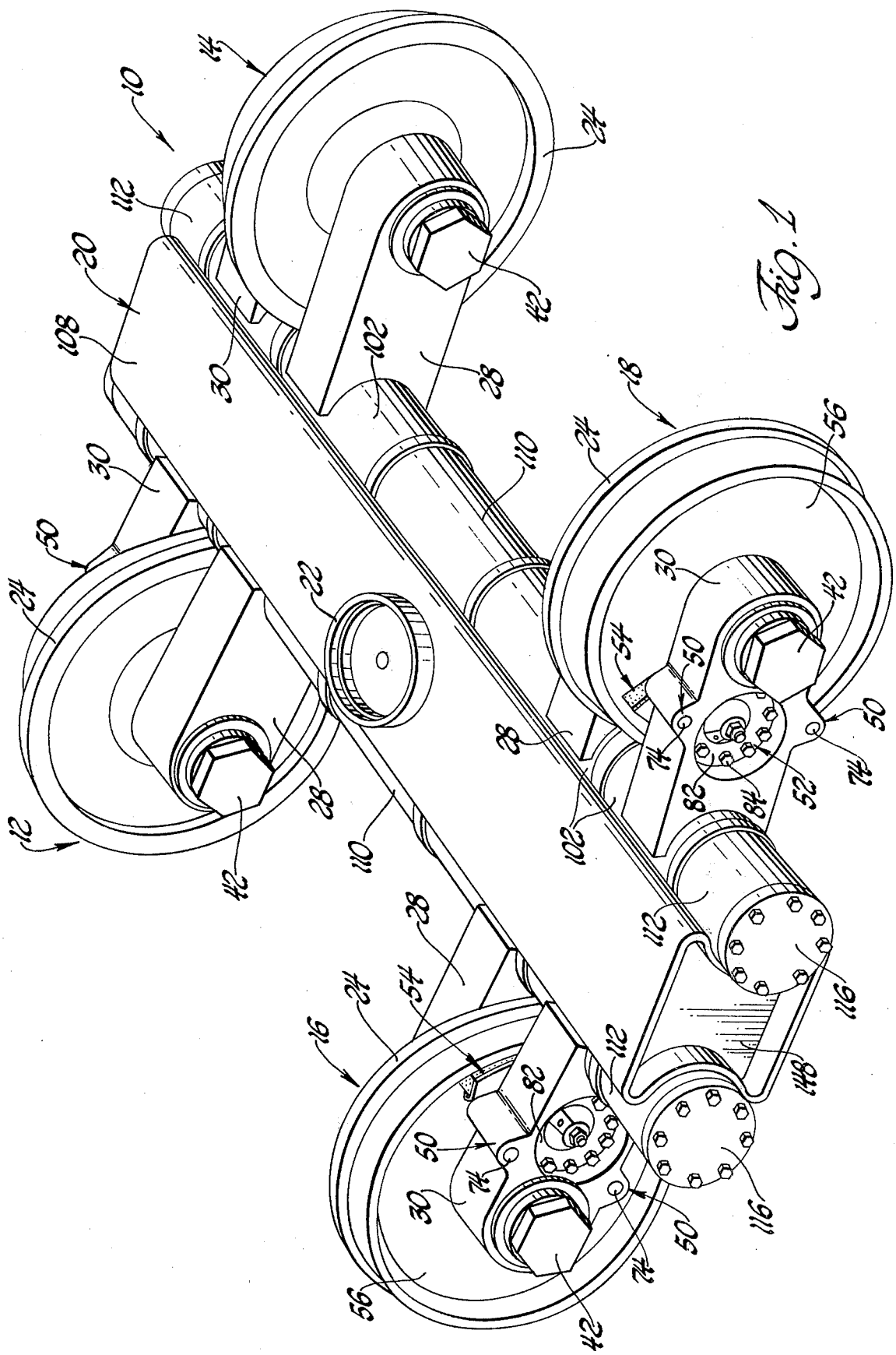
FIG. 1 is a perspective view of a railway truck assembly constructed in accordance with the instant invention.

Referring now to the drawings wherein like numerals indicate like or corresponding parts throughout the several views, a railway truck assembly constructed in accordance with the instant invention is generally shown at 10 in FIG. 1. The railway truck assembly 10 includes four identical wheel units generally shown at 12, 14, 16 and 18 respectively. The wheel units 12 and 14 are mere images of the wheel units 16 and 18. A cross-sectional view of the wheel unit 18 is generally shown in FIG. 2.

The assembly 10 includes a carriage means generally indicated at 20 in FIG. 1 for connection by a bearing means 22 to a railroad car for supporting a railroad car. There are four wheels 24 included in the assembly for engaging railroad track. The wheels 24 are supported by four axles 26. In other words, each axle 26 supports one of the wheels 24. Each wheel 24 is nonrotatably secured to an axle 26 by being welded thereto or keyed thereto.

The assembly 10 also includes four arm means with each arm means supporting one of the axles 26. More specifically, each arm means includes an inside arm 28 and an outside arm 30. An axle 26 extends between the distal ends of each pair of inside and outside arms 28 and 30 so that a wheel 24 is rotatably supported between each pair of inside and outside arms 28 and 30. The arms 28 and 30 have bores extending therethrough for receiving the ends of an axle 26. Each inner arm 28 has a bearing 32 supported in the bore therein and each arm 30 has a bearing 34 supported in the bore therein. The bearings 32 and 34 rotatably support the ends of the axle 26. The ends of the axle 26 are threaded and threadedly receive the bearing adjusting and locking nuts 36 which are, in turn, separated by a spacer 38. Each nut 36 has a hole 40 therethrough and the spacer members 38 have a plurality of holes therethrough whereby the holes 40 may be aligned with each other and one of the holes in the spacer ring 38 for inserting a pin, or the like, therein to prevent relative rotation between each pair of nuts 36. A cap 42 threadedly engages the bore on the exterior of each arm for surrounding the ends of the axle 26. A gasket 44, as shown in FIG. 4, is disposed between each cap and the associated arm 28 and 30. On the inward side of each of the arms 28 and 30 surrounding the axle 26 there is included an oil seal 44 retained in position by an oil seal snap ring 46. An oil seal wiper ring 48 is associated with each oil seal 44.

The outside arm 30 of each pair includes a brake shoe support means generally indicated at 50 and brake shoe actuator means generally indicated at 52. There is also included a brake shoe 54 which engages a disc 56 which is, in turn, removably secured by the bolts 58 to the wheel 24.

The brake shoe support means 50 includes first and second retainer means disposed on opposite sides of each brake shoe actuator means 52 for releasable connection to the brake shoe 54. More specifically, the retainer means are disposed at the top and bottom of each outside arm 30 on opposite sides of a bore extending through the arm. Each retainer means comprises a retainer pin 60 rotatably disposed in a bore in the arm 30. Also included in each retainer pin bore is a spring 62 and a bushing 64. The bushing is disposed in the bore so as to surround the pin 60, and the spring 62 reacts between the bore (through the bushing 64) and the enlarged head 66 of the retainer pin. A key 68 extends diametrically through the end of each retainer pin 60 at the end of the retainer pin 60 extending from the arm 30 toward the adjacent wheel 24 for releasably engaging the brake shoe 54. The brake shoe 54 includes a backing plate having ears 70 extending therefrom. There is an arcuate opening between the ears 70 with a notch 72 extending into the backing plate from the bottom of each arcuate opening.

Figure 5:
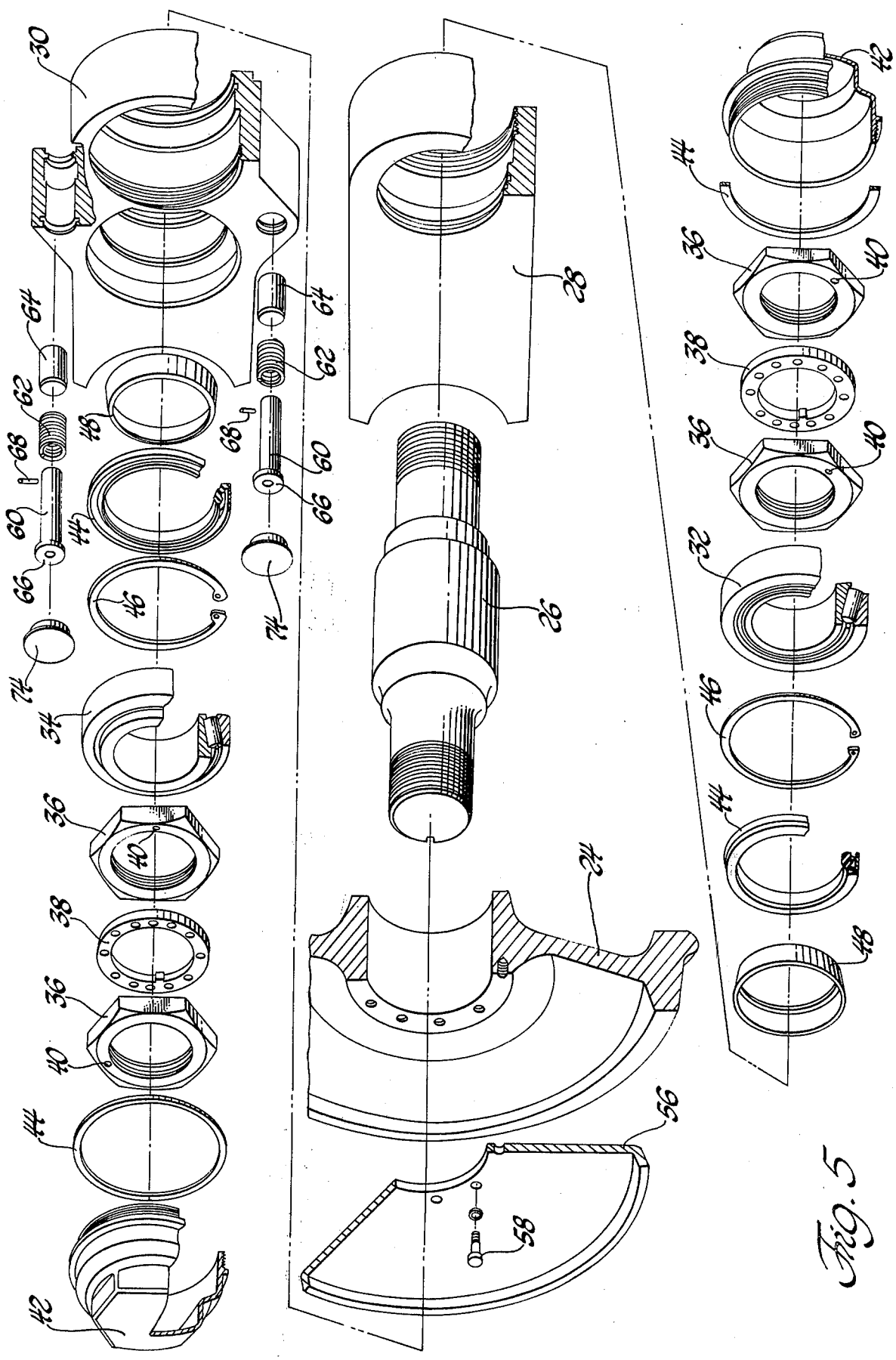
FIG. 5 is an exploded perspective view of the wheel and axle shaft components of the wheel unit shown in FIG. 2.
Figure 6:
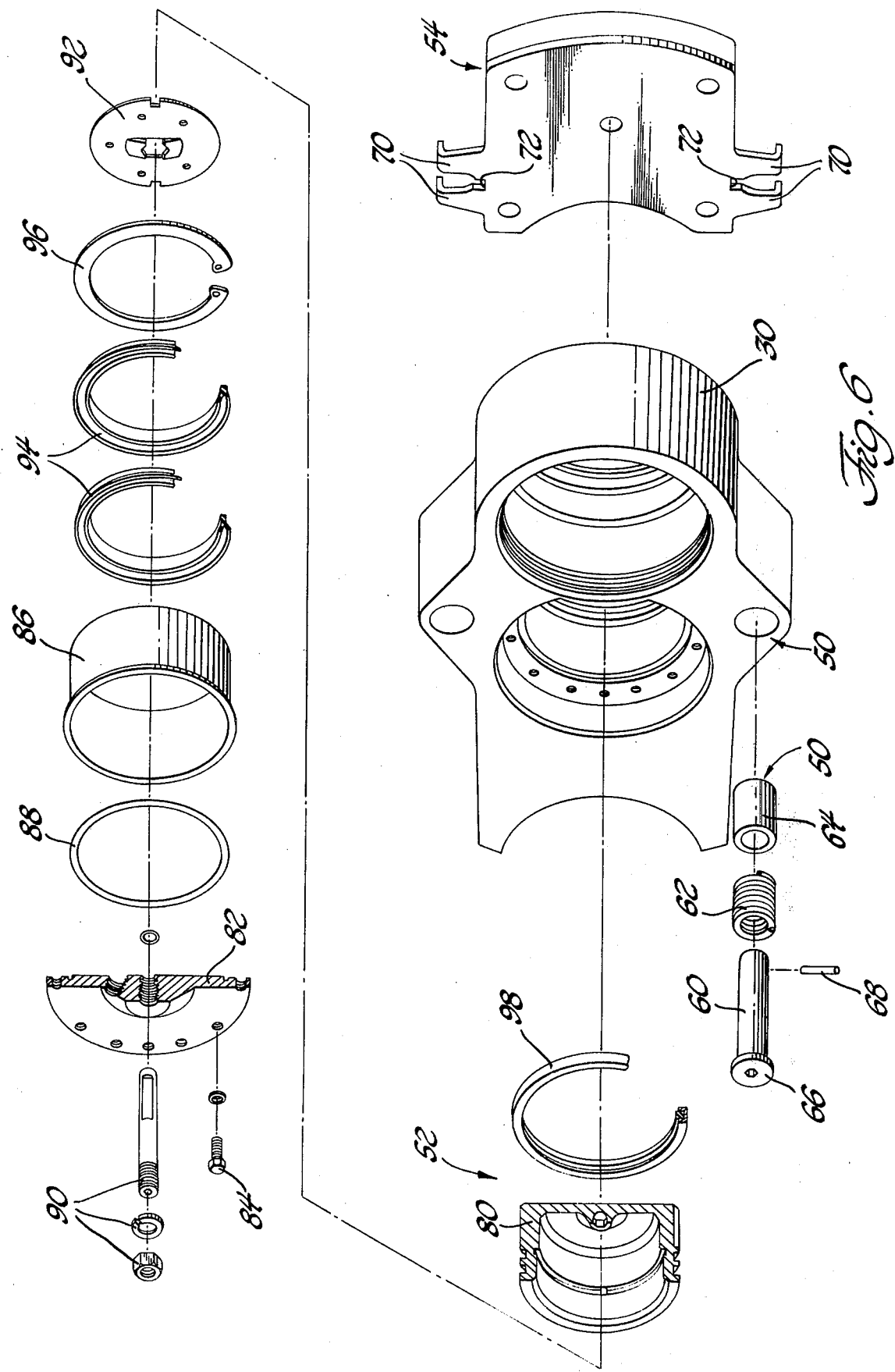
FIG. 6 is an exploded perspective view of the brake shoe actuator assembly.
Figure 7:
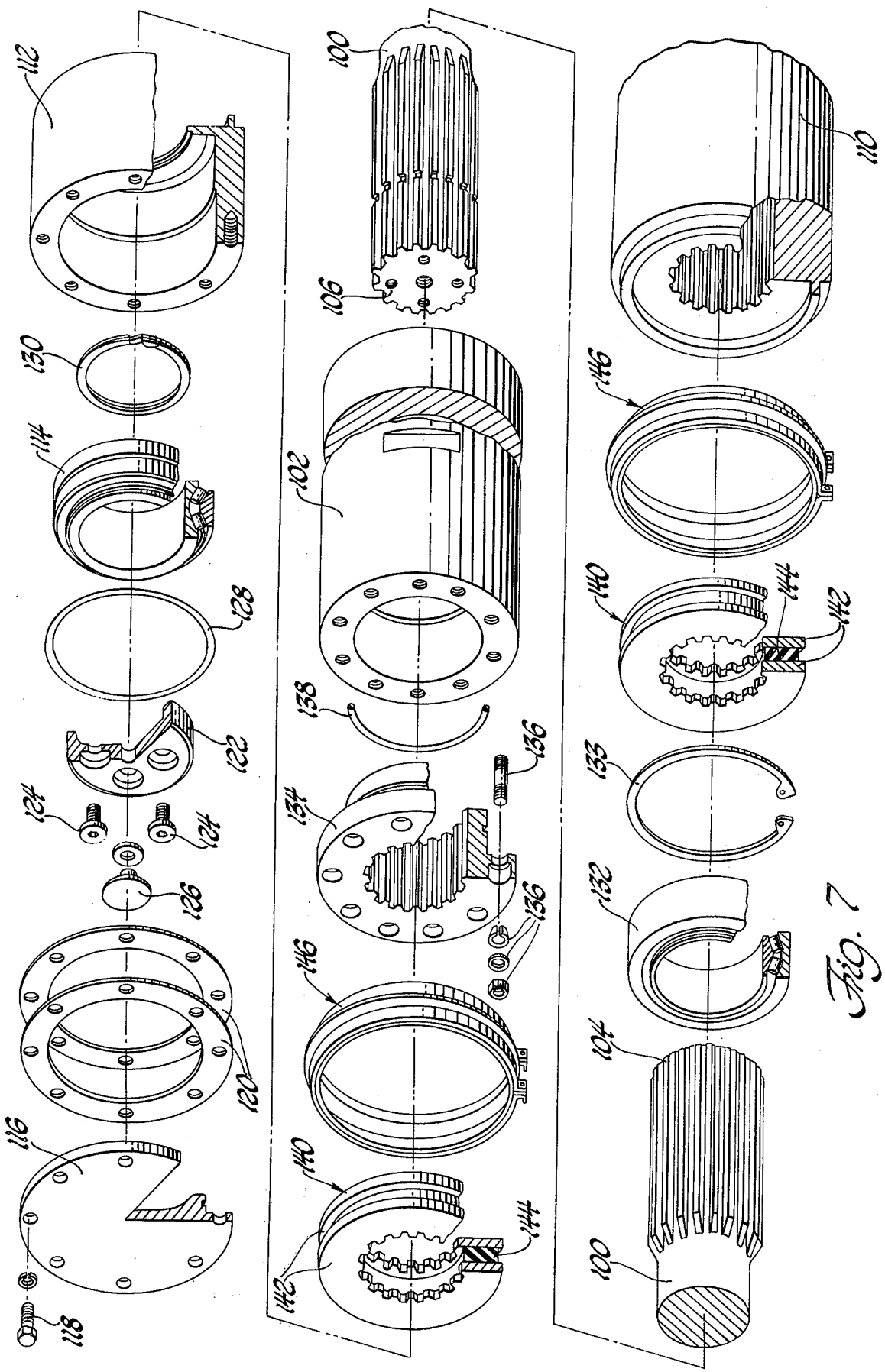
FIG. 7 is an exploded perspective view of the torsion rod components.

Normally each retainer pin 60 is in the position shown in FIG. 4 with the key 68 disposed, as shown in FIG. 3, between the ears or flanges 70 for retaining the brake shoe backing plate against the actuator assembly 54 under the action of the springs 62. If it is desired to remove the brake shoe 54, a cap 74, which normally covers the end of the retainer pin 60, is removed (the cap 74 being shown only in FIG. 5 and not in FIGS. 3 and 4 for clarity purposes) to expose the head of the retainer pin 60. The head of the retainer pin 60 has a recess 76 therein for receiving an allen wrench or the like. An allen wrench is placed into the recess 76 and the pin 60 is shifted to the left, as viewed in FIG. 4, so that the key 68 is disengaged from the flanges or ears 70 and the pin 60 is rotated so that one end of the key 68 is disposed in alignment with the recess or slot 72 whereby the brake shoe 54 may be freely removed. The pin 60 is prevented from moving out of the bore to the right as the key 68 will engage the bottom of the counterbore 78 in the inner face of each arm 30.

Each brake shoe actuator means 52 is disposed in a cavity in an arm 30. Each actuator means 52 includes a hydraulic piston 80 for engaging the adjacent brake shoe 54 for urging the brake shoe 54 into engagement with the disc 56 of the adjacent wheel 24. The cavity in which the piston 80 is disposed is closed by a cap 82 which is secured in position by a plurality of bolts 84. The piston 80 is slidably disposed in a cylinder liner 86 which is, in turn, disposed in the cavity in the outside arm 30. An O-ring 88 is disposed between the cover or cap 82 and the cylinder liner 86. The cap or cover 82 supports an adjuster pin assembly 90 along which an automatic brake adjusting plate 92 moves for automatic wear take-up, i.e., to compensate for wear of the brake shoe 54. Also included are cylinder packings 94 which are held in position by the snap ring 96. Also included is the cylinder seal 98.

As will be appreciated, the actuator assembly 52 is easily hydraulically actuated and easily accessible for repair or replacement.

The assembly 10 also includes four torsion means with each torsion means connecting one pair of inside and outside arms 28 and 30 to the carriage means 20 so that each wheel 24 is independently rotatable and is movable relative to the carriage means independently of the other wheels. Each of the torsion means includes an independent torsion rod 100. Each arm means including a pair of arms 28 and 30 and a torsion bar support sleeve member 102. Each sleeve member 102 extends transversely of the arms 28 and 30 and is rigidly secured thereto as by welding or the like. Each sleeve member surrounds an adjacent torsion rod 100.

Each torsion rod 100 has an inward end 104 nonrotatably supported by the carriage means 20 and an outward end 106 rotatably supported by the carriage means 20. More specifically, the carriage means 20 includes a central beam 108 which is hollow and has a cross section including parallel top and bottom and concave sides. The carriage means also includes a reaction sleeve 110 secured on each side of the central beam 108 at the mid-length thereof. More specifically, each inward end 104 of each torsion rod 100 is splined and is in splined nonrotatable relationship with the reaction sleeve 110 whereby the inward end 104 of each torsion rod 100 is prevented from rotating relative to the carriage means 20. The carriage means 20 includes an outer bearing cage members 112 secured to the central beam 108 so as to surround each of the outward ends 106 of each of the torsion rods 100. A first bearing assembly 114 is disposed in each cage member 112 and is in splined relationship with the outward end of each torsion rod 100 for rotatably interconnecting the outward end 106 of each torsion rod 100 and the cage member 112 of the carriage means 20. A cover plate 116 is secured to the cage member 112 by bolts 118 with shims 120 disposed between the cover 116 and the cage member 112. An outer bearing retainer 122 is secured to the end 106 of the torsion rod 100 by fasteners 124. A torsion bar thrust button 126 is disposed in the outward end of each torsion bar for abutting the adjacent cover 116. The assembly also includes an O-ring 128 and a bearing retainer ring 130.

A second bearing assembly 132 is disposed on the splined inner end 104 of each torsion rod 100 and rotatably supports the inward end of each sleeve member 102 whereby the inward end of each sleeve member 102 is rotatably supported on the inward end 104 of the adjacent torsion rod. A snap ring 133 retains the bearing assembly 132 in position. Thus, the outward end of each torsion rod is rotatably supported by the carriage means through the cage members 112 whereas the inward end of each sleeve member 102 is rotatably supported on the nonrotatable inward end 104 of each torsion rod 100.

The outward end 106 of each torsion rod is in splined connection with the outward end of the adjacent sleeve member 102 through torque transmitting member 134 which has a splined bore for coacting with the splined end 106 of the adjacent torsion bar and which is connected to the end of the sleeve member 102 by fastening elements 136 with an O-ring 138 disposed therebetween.

The outward end of each sleeve member 102, through the member 134, is movable along the splined outward end 106 of the adjacent torsion rod 100 and each second bearing assembly 132 is movable along the splined end 104 of the associated torsion rod 100 whereby each sleeve member 102 may move longitudinally relative to the adjacent or associated torsion rod 100. Shifting means comprising the resilient assemblies generally indicated at 140 are disposed between each end of the sleeve members 102 and the members 110 and 112 of the carriage means respectively for allowing each sleeve member 102 to move longitudinally. Each reaction assembly comprises a pair of spaced plates 142, each of which is splined to the adjacent torsion rod and separated by a resilient washer 144 sandwiched between the plates 142. The resilient washer 144 may be made of various materials, such as rubber, plastic or the like.

There is also included sealing means generally indicated at 146 which interconnects the outward end of each sleeve member 102 and the adjacent cage member 112 as well as the inward end of each sleeve member 102 and the adjacent reaction sleeve 110.

As alluded to above, the central beam 108 is hollow and has its ends closed by the plates 148. The cage members 112, the sleeve members 102 and the reaction sleeve members 110 are disposed or nestled in the concave sides of the central beam 108. As pointed out above, the cage members 112 and the reaction sleeves 110 are secured to the central beam 108 by welding, or the like. Each pair of arms 28 and 30 extend generally horizontally from a sleeve member 102 and each sleeve member 102 is supported by a torsion rod 100, each torsion bar 100 having its inner end fixed rotatably relative to the carriage means 20 and its outer end connected to the outer end of the sleeve member 102 to control movement of the arms 28 and 30. In other words, the axis of each wheel 24 may move in an arc about the axis of the associated torsion rod 100 for moving vertically, as the associated torsion rod 100 twists along its length between its outward and inward ends. Thus, it will be appreciated that each wheel 24 may move both rotatably and in an arc vertically independently of the other wheels of the assembly 10.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A railway truck assembly comprising;
carriage means for connection to a railway car, four wheels for engaging railway track, four axles with each axle supporting one of said wheels, four arm means with each arm means supporting one of said axles, and four torsion means with each torsion means connecting one of said arm means to said carriage means so that each of said wheels is independently rotatable and is movable relative to said carriage means independently of the other wheels, each of said arm means including inside and outside arms, one of said axles extending between the distal ends of each pair of said inside and outside arms and rotatably supporting one of said wheels between each pair of said inside and outside arms, one of said arms of each pair including brake shoe support means and brake shoe actuator means adjacent said brake shoe support means for urging a brake shoe supported by said brake shoe support means toward the adjacent wheel, said brake shoe support means including first and second retainer means disposed on opposite sides of each of said brake shoe actuator means for releasable connection to a brake shoe.

2. An assembly as set forth in claim 1 wherein each of said retainer means comprises a retainer pin rotatably disposed in a bore in said one of said arms and a spring disposed in each of said bores for reacting between the bore and said retainer pin, each retainer pin having a key extending diametrically of the end thereof which extends from the adjacent arm toward the adjacent wheel for releaseably engaging a brake shoe.

3. An assembly as set forth in claim 2 wherein each of said brake shoe actuator means comprises a hydraulic piston assembly disposed in a cavity in an arm for engaging and urging an adjacent brake shoe toward the adjacent wheel.

4. An assembly as set forth in claim 3 including a brake disc removably connected to each of said wheels for engagement by an adjacent brake shoe.

5. An assembly as set forth in claim 4 wherein said brake shoe actuator means and said brake shoe support means and said brake shoe support means are disposed on each of said outside arms.

6. A railway truck assembly comprising; carriage means for connection to a railway car, four wheels for engaging railway track, four axles with each axle supporting one of said wheels, four arm means with each arm means supporting one of said axles and four torsion means with each torsion means connecting one of said arm means to said carriage means so that each of said wheels is independently rotatable and is movable relative to said carriage means independently of the other wheels, each of said arm means including inside and outside arms, one of said axles extending between the distal ends of each pair of said inside and outside arms and rotatably supporting one of said wheels between each pair of said inside and outside arms, one of said arms of each pair including brake shoe support means and brake shoe actuator means adjacent said brake shoe support means for urging a brake shoe supported by said brake shoe support means toward the adjacent wheel, each of said torsion means including an independent torsion rod, each of said torsion rods having an inward end nonrotatably supported by said carriage means and an outward end rotatably supported by said carriage means, each of said arm means including a sleeve member extending transversely of and rigidly secured to said arms thereof, each of said sleeve members surrounding an adjacent torsion rod and having an outward end nonrotatably supported by said adjacent torsion rod and an inward end rotatably supported by said adjacent torsion rod.

7. An assembly as set forth in claim 6 including shifting means for allowing each of said sleeve members to move longitudinally relative to the adjacent torsion rod.

8. An assembly as set forth in claim 7 including a first bearing rotatably interconnecting said outward end of each torsion rod and said carriage means, and a second bearing rotatably supporting said inward end of each sleeve member on said inward end of the adjacent torsion rod.

9. An assembly as set forth in claim 8 wherein each torsion rod is splined at said ends thereof, said outward end of each torsion rod being in splined connection with said outward end of the adjacent sleeve member, said inward end of each torsion rod being in splined connection with said carriage means.

10. An assembly as set forth in claim 9 wherein said outward end of each sleeve member is movable along the splined outward end of the adjacent torsion rod, and each of said second bearings is movable with the adjacent sleeve member along the splined inward end of the adjacent torsion rod.

11. An assembly as set forth in claim 10 wherein said shifting means includes resilient members disposed between each end of said sleeve members and said carriage means.

12. An assembly as set forth in claim 11 wherein said carriage means includes a central beam extending transversely of said arms, two of said wheels being aligned transversely of said central beam adjacent one end thereof and the other two of said wheels being aligned transversely of said central beam adjacent the opposite end thereof.

13. An assembly as set forth in claim 12 wherein said central beam is hollow.

14. An assembly as set forth in claim 12 wherein said carriage means further includes a reaction sleeve secured on each side of said central beam at the midlength thereof, each reaction sleeve being splined and receiving said inward ends of the two adjacent torsion rods, an outer bearing cage member secured to said central beam and surrounding each of said outward ends of each of said torsion rods, each of said cage members supporting one of said first bearings for rotatably supporting said outward ends of said torsion rods.

15. An assembly as set forth in claim 14 wherein said resilient members are disposed between said inward end of each of said sleeve members and the adjacent reaction sleeve and said outward end of each of said sleeve members and the adjacent cage member.

16. An assembly as set forth in claim 15 wherein each of said reaction members comprises a pair of spaced plates splined to the adjacent torsion rod and a resilient washer sandwiched between said plates.

17. An assembly as set forth in claim 16 wherein said central beam is hollow in cross section with the top parallel to the bottom and including concave sides; said gage members, said sleeve members and said reaction sleeve members being disposed in said concave sides of said beam.

18. An assembly as set forth in claim 17 including sealing means interconnecting said outward end of each sleeve member and the adjacent cage member and said inward end of each sleeve member and the adjacent reaction sleeve.

19. An assembly as set forth in claim 15 wherein said brake shoe support means includes first and second retainer means disposed on opposite sides of each of said brake shoe actuator means for releasable connection to a brake shoe.

20. An assembly as set forth in claim 19 wherein each of said retainer means comprises a retainer pin rotatably disposed in a bore in said one of said arms and a spring disposed in each of said bores for reacting between the bore and said retainer pin, each retainer pin having a key extending diametrically of the end thereof which extends from the adjacent arm toward the adjacent wheel for releaseably engaging a brake shoe.

21. An assembly as set forth in claim 20 wherein each of said brake shoe actuator means comprises a hydraulic piston assembly disposed in a cavity in an arm for engaging and urging an adjacent brake shoe toward the adjacent wheel.

* * * * *